United States Patent
Chiu et al.

(10) Patent No.: US 8,641,238 B2
(45) Date of Patent: Feb. 4, 2014

(54) LIGHT SOURCE MODULE

(75) Inventors: Shih-Ting Chiu, Chiayi (TW); Chien-Wen Chiu, Chiayi (TW)

(73) Assignee: Beautiful Light Technology Corp., Chiayi (TW)

(*) Notice: Subject to any disclaimer, the term of this patent is extended or adjusted under 35 U.S.C. 154(b) by 268 days.

(21) Appl. No.: 13/290,136

(22) Filed: Nov. 7, 2011

(65) Prior Publication Data

US 2013/0027926 A1 Jan. 31, 2013

(30) Foreign Application Priority Data

Jul. 27, 2011 (TW) .............................. 100126634 A

(51) Int. Cl.
*F21V 5/04* (2006.01)
*F21V 1/00* (2006.01)

(52) U.S. Cl.
USPC ................. 362/335; 362/311.02; 362/311.09; 362/311.1; 362/336; 362/355

(58) Field of Classification Search
USPC ............... 362/311.02, 311.06, 311.09, 311.1, 362/327, 329, 331, 333–336, 355, 361
See application file for complete search history.

(56) References Cited

U.S. PATENT DOCUMENTS

| 6,361,192 | B1* | 3/2002 | Fussell et al. | 362/331 |
| 6,598,998 | B2* | 7/2003 | West et al. | 362/307 |
| 6,637,921 | B2 | 10/2003 | Coushaine | |
| 6,724,543 | B1* | 4/2004 | Chinniah et al. | 362/335 |
| 7,474,474 | B2* | 1/2009 | Angelini et al. | 359/708 |
| 7,489,453 | B2 | 2/2009 | Chinniah et al. | |
| 7,626,210 | B2 | 12/2009 | Shchekin et al. | |
| 7,918,583 | B2* | 4/2011 | Chakmakjian et al. | 362/335 |
| 8,246,197 | B2* | 8/2012 | Huang | 362/235 |
| 2006/0239020 | A1* | 10/2006 | Albou | 362/329 |

FOREIGN PATENT DOCUMENTS

| CN | 101556023 A | 10/2009 |
| CN | 201448661 U | 5/2010 |
| CN | 201731297 U | 2/2011 |
| DE | 102006053535 A1 | 7/2007 |
| JP | 5995651 | 6/1984 |
| JP | 3143874 U | 8/2008 |
| JP | 2009199863 A | 9/2009 |
| TW | 569476 | 1/2004 |
| TW | 200730963 | 8/2007 |
| TW | 200944835 | 11/2009 |
| TW | 1318803 | 12/2009 |
| WO | 2011055467 A1 | 5/2011 |

* cited by examiner

*Primary Examiner* — Alan Cariaso
(74) *Attorney, Agent, or Firm* — CKC & Partners Co., Ltd.

(57) ABSTRACT

A light source module includes a circuit board, a light-emitting diode, a lens, and a lamp screen. An upper surface of the lens has a first recessed portion including a flat surface and a curved side surface. The flat surface is at the center of the upper surface. The curved side surface surrounds the flat surface and stretches to the flat surface from a side surface of the lens to form the first recessed portion. A lower surface of the lens has a second recessed portion defining a recessed space and includes a curved surface and a sidewall portion. The curved surface is a convex surface and opposite to the flat surface. The sidewall portion surrounds the recessed space. An inner surface of the sidewall portion is concaved. The light-emitting diode is disposed in the recessed space. The lamp screen is used to diffuse the light passing through the lens.

6 Claims, 5 Drawing Sheets average beam angle average beam angle

LIGHT SOURCE MODULE

RELATED APPLICATIONS

This application claims priority to Taiwan Application Serial Number 100126634, filed Jul. 27, 2011, which is herein incorporated by reference.

BACKGROUND

1. Field of Invention

The present invention relates to a light source module. More particularly, the present invention relates to a light source module for increasing a light emission angle of a light-emitting diode.

2. Description of Related Art

Because the luminous efficiency of a traditional incandescent light bulb is bad, the incandescent light bulb is very likely to be prohibited in various countries of the world under environmental protection and energy saving trends. A light-emitting diode (LED) has great potential for substituting the incandescent light bulb. A light emission angle of the incandescent light bulb can reach to about 300 degrees (the light emission angle is estimated by using an angle range developed by the light with half of the maximum light intensity). A traditional LED has a Lambertion light field distribution, and thus a LED lamp constructed from a plurality of LEDs has a small light-outputting angle because of the Lambertion light field distribution, and when the lamp is used in a bigger space, it is very difficult to achieve a uniform (omnidirectional) illumination distribution for the LED lamp. Therefore, the LED lamp may not only cause a problem of direct glare but also cause the generation of light speckles, thus limiting the speed of substituting the incandescent light bulb with the LED lamp.

SUMMARY

Therefore, an object of the present invention is to provide a light source module to enable the light outputting angle of the light emitted by the LED having high directivity to reach that of the light emitted by the incandescent light bulb, and enable the light field distribution of the light emitted by the LED to be uniform, thereby preventing ununiform illumination and generation of light speckle.

According to an embodiment of the present invention, the light source module includes a circuit board, a lens, at least one light emitting chip, and a lamp screen. The lens is disposed on a surface of the circuit board, wherein the lens is in the form of a cylinder, and comprises a side surface, an upper surface, and a lower surface. The upper surface has a first recessed portion, wherein the first recessed portion comprises is a flat surface and a curved side surface. The flat surface is located on the upper surface, wherein the flat surface defines a mounting region on the surface of the circuit board, and the mounting region is an orthogonal projection of the flat surface onto the surface of the board. The curved side surface surrounds the flat surface and stretches to the flat surface from the side surface to the flat surface to form the first recessed portion to form the first recessed portion. The lower surface is in conjunction with the circuit board, wherein the lower surface has a second recessed portion, and the second recess portion defines a recessed space and comprises a curved surface and a sidewall portion. The curved surface is opposite to the flat surface, wherein the curved surface is a convex surface. The sidewall portion surrounds the recessed space, wherein the sidewall portion has an inner surface and the inner surface is concaved. The at least one light emitting chip is disposed on the mounting region of the circuit board to enable the light emitted by the at least one light emitting chip to uniformly scatter out of the lens by the lens. The lamp screen covers the lens for protecting the lens, and diffusing the light passing through the lens, thereby enabling the light module to have a light emission angle of more than 300 degrees.

As described above, the light source module of the present invention can convert the directional light emitted by the LED chip disposed therein into more uniform light having a greater outputting angle, so that the light source module of the present invention can achieve uniform light field distribution, prevention of light speckle generation, and the light-outputting angle of the incandescent light bulb.

BRIEF DESCRIPTION OF THE DRAWINGS

The above and other objectives, features, advantages and embodiments of the present invention can be more fully understood with reference to the accompanying drawings as follows.

DETAILED DESCRIPTION

Figure 1A:
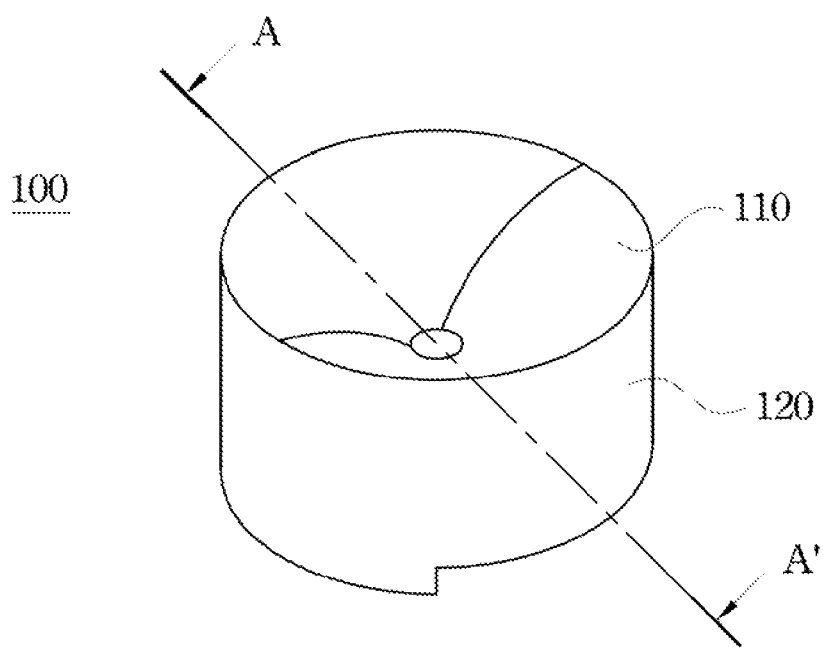
FIG. 1A is a schematic diagram showing a cubic structure of a light source according to an embodiment of the present invention.
Figure 1B:
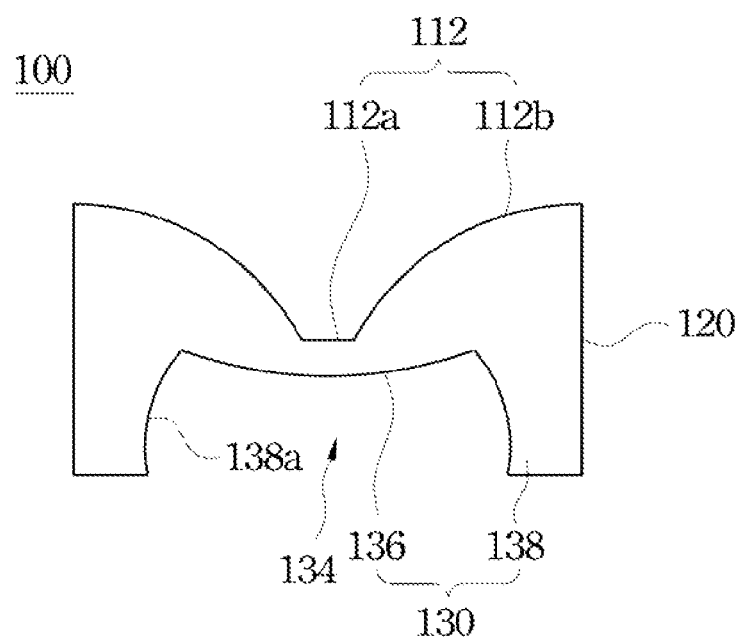
FIG. 1B is a schematic cross-sectional diagram showing a structure of a lens along a cutting-line A-A'.

Referring to FIG. 1A and FIG. 1B, FIG. 1A is a diagram showing a cubic structure of a light source according to an embodiment of the present invention, and FIG. 1B is a cross section diagram showing a structure of a lens 100 along a cutting-line A-A'. The lens 100 is in a form of cylinder, and an upper surface 110 thereof has a recessed portion 112. The recessed portion 112 includes a flat surface 112a and a curved side surface 112b. The flat surface 112a is at the center of the upper surface 110. The curved side surface 112b is a convex surface and surrounds the flat surface 112a. The curved side surface 112b stretches from the side surface 120 to the flat surface 112a to form the recessed portion 112, wherein a portion between the curved side surface and the side surface of the lens is at the highest position of the upper surface of the lens, and a height of an upper surface 110 of the lens 100 is slowly decreased from the side surface 120 to the flat surface 112a.

The lower surface 130 has a recessed portion, wherein the recessed portion defines a recessed space 134 and includes a curved surface 136 and a sidewall portion 138. The curved surface 136 is a convex surface and opposite to the flat surface 112a of the upper surface 112. The sidewall portion 138 surrounds the recessed space 134 and has a curved inner surface 138a. The inner surface 138a is concaved. It can be understood from FIG. 2B that the sidewall portion 138 is similar to a plano-concave lens, and the plano-concave lens can diffuse light of a light source located in the inside of the sidewall portion 138.

In this embodiment, the lens 100 can be made of polycarbonate (PC), glass, epoxy, or silicon, etc, but the embodiments of the present invention are not limited thereto.

Figure 2A:
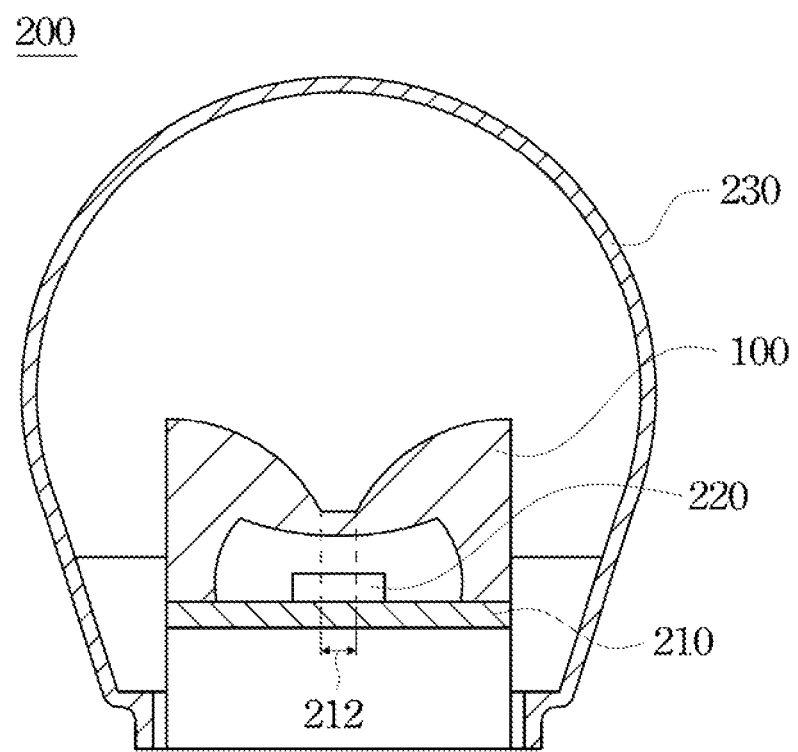
FIG. 2A is a schematic cross-sectional diagram showing a structure of a light source module according to an embodiment of the present invention.
Figure 2B:
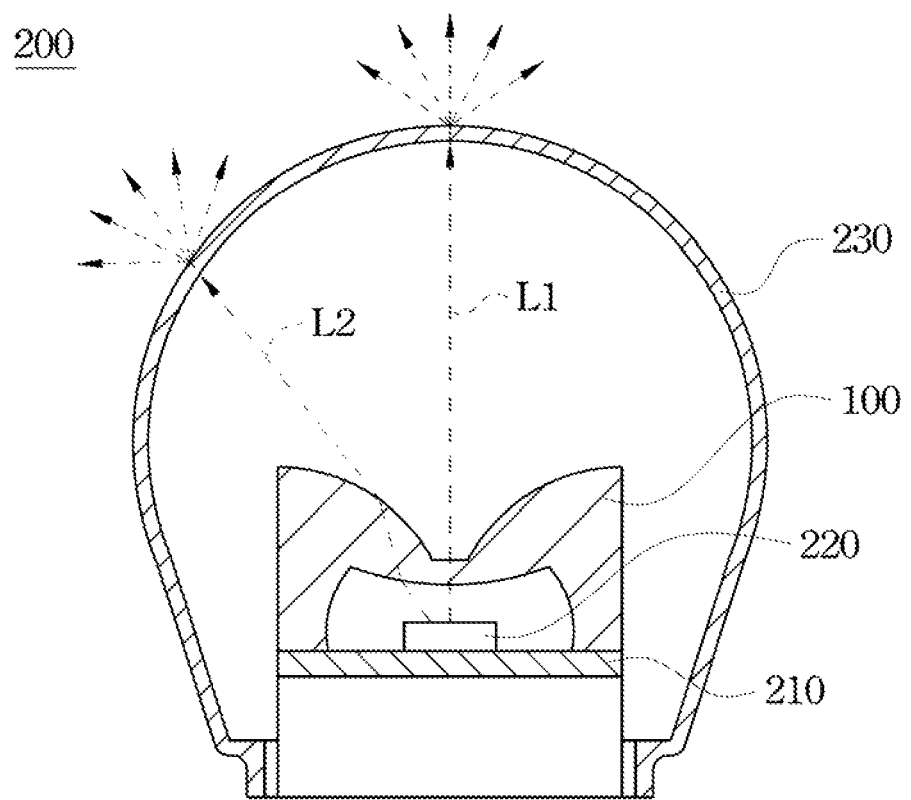
FIG. 2B is a schematic diagram showing paths of light emitted by a LED chip according to an embodiment of the present invention.
Figure 3A:
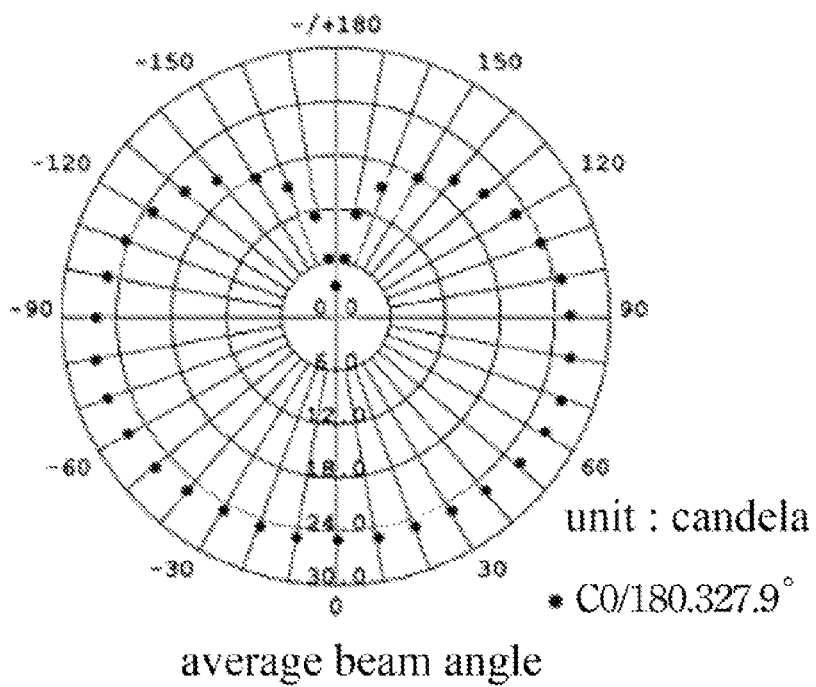
FIG. 3A to FIG. 3D are schematic diagrams showing a light field distribution of a light source module according to an embodiment of the present invention.
Figure 3B:
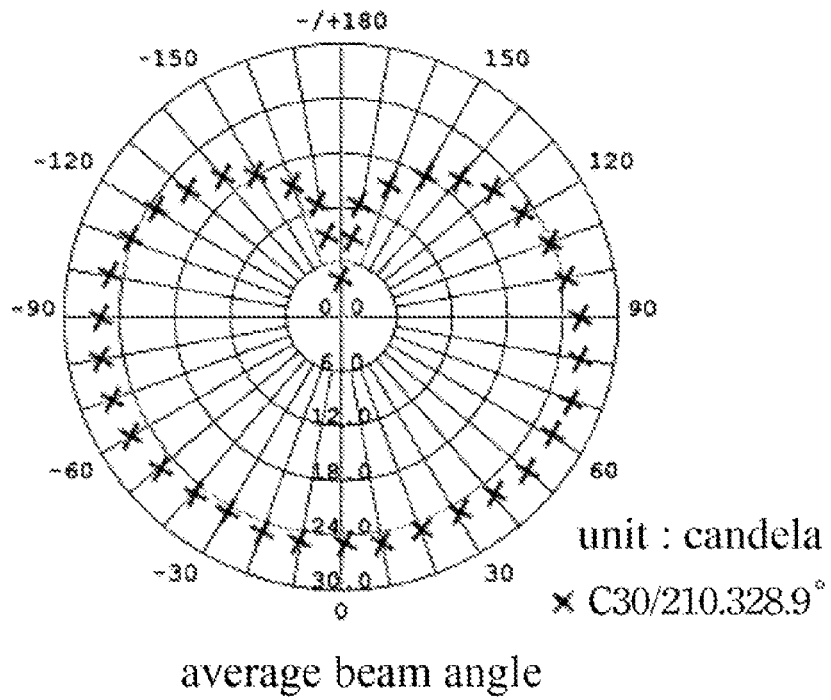
Figure 3C:
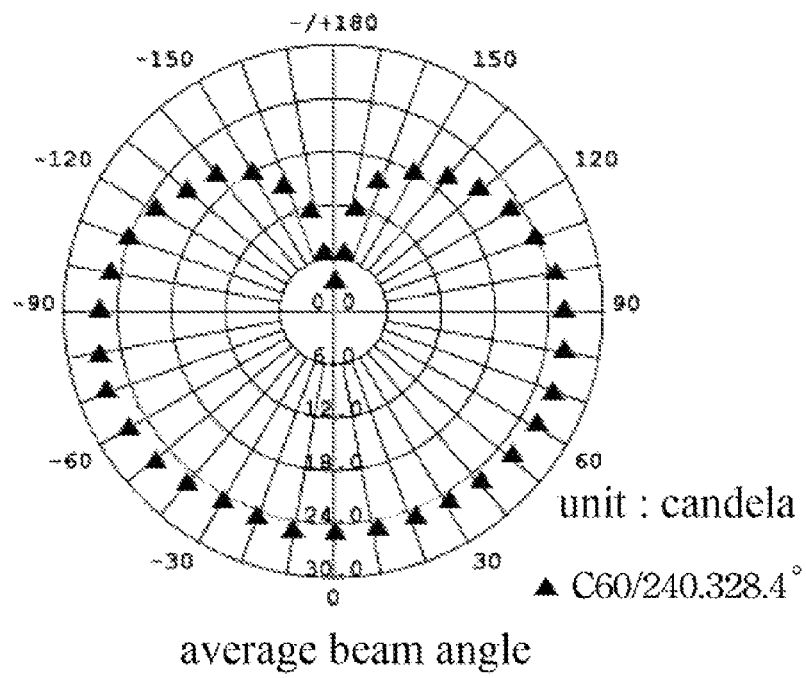
Figure 3D:
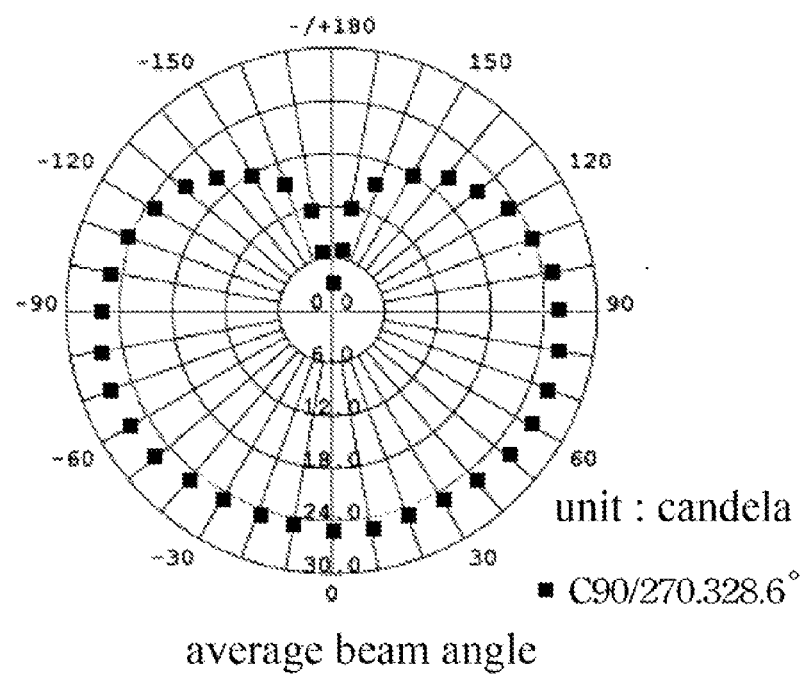

Referring to FIG. 2A and FIG. 2B, FIG. 2A is a cross section diagram showing a structure of a light source module 200 according to an embodiment of the present invention, and FIG. 2B is a diagram showing paths of light emitted by a LED chip according to an embodiment of the present invention. As shown in FIG. 2A, light source module 200 includes the lens 100, a circuit board 210, at least one LED chip 220, and a lamp screen 230. The LED chip 220 and the lens 100 are disposed on the circuit board 210, wherein the LED chip 220 is disposed in the recessed space 134 and just under the flat surface 112a. In other words, the flat surface 112a is projected onto the circuit board 210 to define a diode mounting region 212 on the circuit board 210, and the LED chip 220 is disposed on the diode mounting region 212, and the main emitting direction (with greater lightness) is toward the flat surface 112a.

As shown in FIG. 2B, when the LED chip 200 emits light, the light emitted straight upward (labeled by L1) at first passes through the curved surface 136 and the flat surface 112a of the lens 100, and then reaches to the lamp screen 230. The light emitted toward other direction (such as L2) at first passes through the curved surface 136 and the curved side surface 112b of the lens 100, and then reaches to the lamp screen 230. Therefore, the Lambertion light field distribution of the LED chip 220 is converted to a more uniform light field distribution through a first optical design of the lens 100.

When the light reaches to the lamp screen, the lamp screen diffuses the light reaching to the lamp screen, so that the distribution of the light is further converted to a more uniform distribution through a second optical design of the lamp screen. In this embodiment, the material of the lamp 230 is a light-diffusing material with high transmission rate.

Referring to FIG. 3A to FIG. 3D, FIG. 3A to FIG. 3D are diagrams showing the light field distribution of the light source module 200 according to an embodiment of the present invention. It can understood from the light field distribution shown in FIG. 3A to FIG. 3D that the source module 200 uses the first optical design of the lens and the second optical design of the lamp screen to enable the distribution of the light emitted by the LED chip 220 to be more uniform, and a light outputting angle thereof is increased to more than 300 degrees (the experiment data shows the light outputting angle is 328.5 degrees).

As mentioned above, the embodiments of the present invention provides a lens and a light source module using the same. The lens enables the directional LED light source (with beam angle between 0-180 degrees) to be converted to an omnidirectional light source (with beam angle of more than 181 degrees), and the light source module using the lens uses the secondary optical design of the lamp screen to enhance the light outputting angle and the light field distribution of the LED chip, so that the light source module can achieve uniform light field distribution, lower unified glare ratio (UGR), and the light-outputting angle of the incandescent light bulb.

Although the present invention has been described in considerable detail with reference to certain embodiments thereof, other embodiments are possible. Various alternations and modifications can be made to these certain embodiments by those skilled in the art without departing from the spirit and scope of the present invention. Such alternations and modifications are intended to fall within the scope of the appended claims.

What is claimed is:

1. A light source module, comprising:
a circuit board;
a lens disposed on a surface of the circuit board, wherein the lens is in the form of a cylinder, and comprises:
 a side surface;
 an upper surface having a first recessed portion, wherein the first recessed portion comprises:
  a flat surface located on the upper surface, wherein the flat surface defines a mounting region on the surface of the circuit board, and the mounting region is an orthogonal projection of the flat surface onto the surface of the board; and
  a curved side surface surrounding the flat surface and stretching to the flat surface from the side surface to the flat surface to form the first recessed portion to form the first recessed portion;
 a lower surface in conjunction with the circuit board, wherein the lower surface has a second recessed portion, and the second recess portion defines a recessed space and comprises:
  a curved surface opposite to the flat surface, wherein the curved surface is a convex surface; and
  a sidewall portion surrounding the recessed space, wherein the sidewall portion has an inner surface and the inner surface is concaved;
at least one light emitting diode (LED) chip disposed on the mounting region of the circuit board to enable light emitted by the at least one LED chip to be uniformly scattered out of the lens by the lens; and
a lamp screen covering the lens for protecting the lens and diffusing the light passing through the lens, thereby enabling the light module to have a light emission angle of more than 300 degrees.

2. The light source module of claim 1, wherein a portion between the curved side surface and the side surface of the lens is at the highest position of the upper surface of the lens.

3. The light source module of claim 2, wherein the curved side surface is a convex surface.

4. The light source module of claim 3, wherein an extending direction of the side surface of the lens is orthogonal to that of the flat surface of the lens.

5. The light source module of claim 1, wherein the lens is made of polycarbonate.

6. The light source module of claim 1, wherein the at least one LED chip has a directional light field distribution, and a main light emitting direction towards the flat surface of the lens.

* * * * *